US007868066B2

(12) United States Patent
Fenn

(10) Patent No.: US 7,868,066 B2
(45) Date of Patent: *Jan. 11, 2011

(54) AQUEOUS DISPERSIONS AND COATINGS COMPRISING MODIFIED EPOXY RESINS COMPRISING THE REACTION PRODUCT OF ROSIN AND A DIENOPHILE

(75) Inventor: David Fenn, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 724 days.

This patent is subject to a terminal disclaimer.

(21) Appl. No.: 11/780,711

(22) Filed: Jul. 20, 2007

(65) Prior Publication Data

US 2009/0020040 A1 Jan. 22, 2009

(51) Int. Cl.
C08K 3/20 (2006.01)
C08L 33/14 (2006.01)
C08L 63/02 (2006.01)
C08L 63/10 (2006.01)

(52) U.S. Cl. .......... 523/420; 523/403; 523/404; 523/414; 523/415; 523/416; 524/558; 525/327.3; 525/423; 525/438; 525/454; 525/523; 525/533

(58) Field of Classification Search .......... None
See application file for complete search history.

(56) References Cited

U.S. PATENT DOCUMENTS

| 2,653,142 A | 9/1953 | Cody |
| 2,947,711 A * | 8/1960 | Cooke, Jr. et al. ........ 528/111.3 |
| 3,057,809 A | 10/1962 | Newey |
| 3,366,563 A | 1/1968 | Hart |
| 3,658,736 A | 4/1972 | Daimer |
| 3,658,738 A | 4/1972 | van Westrenen |
| 3,668,098 A | 6/1972 | Daimer |
| 3,950,286 A | 4/1976 | Hoenel |
| 3,959,198 A | 5/1976 | Broecker |
| 3,966,654 A | 6/1976 | Aldrich |
| 3,971,708 A | 7/1976 | Davis |
| 4,024,095 A | 5/1977 | Broecker |
| 4,188,312 A | 2/1980 | Kempfer |
| 4,219,382 A | 8/1980 | Leffler |
| 4,292,214 A | 9/1981 | Blount |
| 4,434,256 A | 2/1984 | Dworak |
| 4,715,898 A | 12/1987 | Johnson |
| 4,812,508 A | 3/1989 | Makhlouf |
| 4,857,149 A | 8/1989 | Tiedeman |
| 5,021,538 A | 6/1991 | Crews |
| 5,175,250 A | 12/1992 | Hazen |
| 5,393,337 A | 2/1995 | Nakamura |
| 5,739,184 A | 4/1998 | Marbry |
| 5,767,191 A | 6/1998 | Zawacky |
| 6,060,539 A | 5/2000 | Hermansen |
| 6,206,960 B1 * | 3/2001 | Smith et al. .......... 106/500 |
| 6,229,054 B1 | 5/2001 | Dai |
| 6,262,148 B1 | 7/2001 | Cheng |
| 6,303,676 B1 | 10/2001 | Catena |
| 6,908,995 B2 | 6/2005 | Blount |
| 2005/0056687 A1 * | 3/2005 | Matsumoto et al. ...... 228/248.1 |

FOREIGN PATENT DOCUMENTS

| EP | 0217660 | 4/1987 |
| EP | 0420 063 B1 | 4/1991 |
| EP | 0611024 A2 | 8/1994 |
| GB | 1318056 | 5/1973 |
| GB | 1524407 | 9/1978 |
| GB | 2237019 | 4/1991 |
| JP | 54135007 | 10/1979 |
| JP | 062025182 | 2/1987 |
| JP | 62192476 | 8/1987 |
| JP | 04202413 | 7/1992 |
| JP | 05097968 | 4/1993 |
| JP | 07179565 | 7/1995 |
| JP | 2001233947 | 8/2001 |
| KR | 100559055 B | 3/2006 |
| WO | WO 87/04448 | 7/1987 |
| WO | 01/38446 | 5/2001 |
| WO | WO 01/38446 A1 * | 5/2001 |
| WO | 02/04084 A2 | 1/2002 |

OTHER PUBLICATIONS

Das et al., "Bio oil from pyrolysis of cashew nut shell-characterisation and related properties", Biomass and Bioenergy, 2004, pp. 265-275, vol 27, Elsevier Ltd.

Lora et al., "Recent Industrial Applications of Lignin: A Sustainable Alternative to Nonrenewable Materials", Journal of Polymers and the Environment, Apr. 2002; pp. 39-48, vol. 10, No. 1/2, Plenum Publishing Corporation.

Sun et al., "Comparative study on the curing kinetics and mechanism of a lignin-based-epoxy/anhydride resin system", Polymer, Dec. 19, 2006; pp. 330-337, vol. 48, No. 1, Elsevier Science Publishers B.V., Great Britain.

Ramasri, M. et al., "New binders for cathodic electrodeposition from epoxy resins", Journal of the Oil and Color Chemists' Association, 1986, vol. 69, No. 9, pp. 248-251, Oil and color Chemists' Association, London, United Kingdom.

Wadhwani, Meena et al., "Electrophoretic Coatings based on Phenolic Resins", Asian Journal of Chemistry, 1994, pp. 67-71, vol. 6, No. 1, Ghaziabad, India.

Mustata, Fanica et al., "Polyhydroxyetheresters from resin acids", Polimery 2005; 2004, pp. 176-181, 50, No. 3.

Panda, Himadri et al., "Studies on speciality monomers from rosin", paintindia, Jun. 2002; pp. 67-76, Metrocoat Rajapalayam (P) Ltd., Tamil Nadu, India.

* cited by examiner

*Primary Examiner*—Robert Sellers
(74) *Attorney, Agent, or Firm*—Diane R. Meyers

(57) ABSTRACT

Aqueous dispersions and coatings comprising modified epoxy resins comprising the reaction product of rosin and a dienophile, further reacted with an epoxy resin, are disclosed.

15 Claims, No Drawings

AQUEOUS DISPERSIONS AND COATINGS COMPRISING MODIFIED EPOXY RESINS COMPRISING THE REACTION PRODUCT OF ROSIN AND A DIENOPHILE

FIELD OF THE INVENTION

The present invention relates generally to aqueous dispersions and coatings comprising a modified epoxy resin.

BACKGROUND OF THE INVENTION

The price of raw materials used in many manufacturing processes continues to rise, particularly those whose price rises or falls with the price of oil. Because of this, and because of the predicted depletion of oil reserves, raw materials derived from renewable resources or alternative resources may be desired. An increase in demand for environmentally friendly products, together with the uncertainty of the variable and volatile petrochemical market, has promoted the development of raw materials from renewable and/or inexpensive sources.

SUMMARY OF THE INVENTION

The present invention is directed to an aqueous dispersion comprising a modified epoxy resin comprising the reaction product of rosin and a dienophile comprising a carboxylic group and/or an anhydride group, further reacted with an epoxy resin.

The present invention is further directed to a coating comprising a modified epoxy resin comprising the reaction product of rosin and a dienophile comprising a carboxylic group and/or an anhydride group, further reacted with an epoxy resin.

DETAILED DESCRIPTION OF THE INVENTION

The present invention is directed to an aqueous dispersion comprising a modified epoxy resin comprising the reaction product of rosin and a dienophile. This reaction product is further reacted with an epoxy resin, which product is sometimes referred to herein as the "modified epoxy", "modified epoxy resin" or like terms.

It will be understood that rosin actually comprises a mixture of compounds, with abietic acid often being predominant (i.e. more abietic acid than any other component). Rosin is commercially available as, for example, gum rosin, wood rosin, and tall oil rosin. Abietic acid may be used according to the present invention in its natural form or it may be purified using techniques known to those skilled in the art. In its natural form as a rosin or rosin acid, the abietic acid may be present with isomeric forms such as levoprimaric and resin acids of the pimaric type. Oleoresin material can also be present, as can dihydroabietic acid and dehydroabietic acid. Since rosin is a complex mixture of mainly twenty carbon atom fused ring, mono-carboxylic acids and a small amount of nonacidic components, where the resin acid molecule has the double bonds and the carboxylic acid group, any derivative can be used that maintains the carboxylic acid and the diene group. One suitable example of rosin that can be used is SYLVAROS NCY, a tall oil rosin available from Arizona Chemical, and another is *Brazilian Gum* rosin from Gehring-Montgomery.

The rosin is reacted with a dienophile comprising a carboxylic group and/or anhydride group. Particularly suitable dienophiles include α,β-ethylenically unsaturated mono or dicarboxylic acids or anhydrides such as fumaric acid, maleic acid, acrylic acid, methacrylic acid, itaconic acid, citraconic acid and maleic anhydride. Any other dienophile comprising a carboxylic group and/or an anhydride group can also be used.

The rosin and the dienophile can be reacted in a Diels Alder reaction under conditions well known in the art, such as between the melting point of the rosin and the boiling point of the dienophile. The reaction can be carried out at elevated pressure in order to increase the boiling point of the dienophile. The Diels Alder reaction between rosin and a dienophile containing a carboxylic group and/or anhydride group or groups is described, for example, in Polymer from Renewable Resources—13, Polymers from Rosin Acrylic Acid Adduct, Roy, Kundu and Maiti, Eur. Polym. J., 26(4), 471, 1990; and in Diels-Alder Polymers from Resinic Acids, Mustata and Bicu, Journal of Polymer Engineering, 25(3), 217, 2005, both of which are incorporated by reference herein. This reaction will result in the carboxylated Diels Alder adduct of the rosin ("rosin adduct"). It will be appreciated that the rosin adduct will have on average more than one carboxylic acid functionality per molecule. In certain embodiments the rosin adduct has two carboxylic acid functionalities, one from the rosin and one from the dienophile. The number of carboxylic acid groups per molecule of rosin adduct can be controlled by varying the number of carboxylic acid/anhydride groups per molecule of dienophile and/or by varying the ratio of rosin to dienophile. Use of a dienophile with one carboxylic acid/anhydride group per molecule is particularly suitable. The molar ratio of rosin acid groups to dienophile can be 1:0.25 to 1:2, such as 1:0.5 to 1:1.1, or 1:0.8 to 1:1. When the rosin adduct contains more than two carboxylic acid and/or anhydride functionalities, some of the carboxylic acid and/or anhydride functionalities can be removed by modification of the rosin adduct with a compound having a functionality reactive with carboxylic acid/anhydride, for example an epoxy group or a hydroxyl group. Examples of such modifying compounds include CARDURA E10 (glycidyl ester of versatic acid, available from Hexion Specialty Chemicals), propylene oxide or octanol. The rosin can comprise 95 to 40, such as 90 to 70, wt % of the total solids weight of the rosin adduct.

The rosin adduct is then reacted with the epoxy resin. In certain embodiments, the epoxy resin has at least two epoxy functionalities. A portion of the epoxy functionality will react with the carboxylic acid and/or anhydride functionality on the rosin adduct, and a portion will remain unreacted.

Suitable epoxy resins include but are not limited to those having a 1,2-epoxy equivalency greater than one, such as at least two; that is, polyepoxides that have on average two epoxide groups per molecule. In general, the epoxide equivalent weight of the polyepoxide can range from 100 to 2000, such as from 180 to 1200 or 180 to 500. The epoxy resins may be saturated or unsaturated, cyclic or acyclic, aliphatic, alicyclic, aromatic or heterocyclic. It may contain substituents such as halogen, hydroxyl, and/or ether groups. Particularly suitable polyepoxides are polyglycidyl ethers of polyhydric alcohols, such as cyclic polyols, such as polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Other cyclic polyols can also be used in preparing the polyglycidyl ethers of cyclic polyols. Examples of other cyclic polyols include alicyclic polyols, particularly cycloaliphatic polyols such as 1,2-cyclohexanediol and 1,2-bis(hydroxymethyl)cyclohexane. Epoxy group-containing acrylic polymers can also be used. These polymers typically have an epoxy equivalent weight ranging from about 750 to 2000. Because a portion of the epoxy functionality remains unreacted, the modified epoxy resin is epoxy functional. "Epoxy functional", and like terms, as used herein refer to a compound or polymer having at least one unreacted epoxy group. This epoxy group can undergo reaction with, for example, a carboxylic acid to form an ester bond, with a primary amine to form a secondary amine or with a secondary amine to form a tertiary amine. In this manner, the modified epoxy resin used according to the present invention can be crosslinked or can otherwise form at least a portion of a coating.

The modified epoxy resin can be prepared by any means known in the art, such as the methods that follow: the epoxy resin and rosin adduct are reacted together neat or in the presence of an inert organic solvent; any suitable solvent can be used such as a ketone, including methyl isobutyl ketone and/or methyl amyl ketone, aromatics such as toluene and/or xylene, and/or glycol ethers such as the dimethyl ether of diethylene glycol. The reaction is typically conducted at a temperature of 80° C. to 160° C. for 30 to 180 minutes until an epoxy group-containing resinous reaction product is obtained. Alternatively the reaction can be carried out in a continuous reactor and can be conducted at a temperature of 140° C. to 280° C. for 1 to 20 minutes. The equivalent ratio of reactants, i.e., epoxy groups:carboxylic acid/anhydride groups, is typically from about 1.00:0.20 to about 1.00:0.80.

It will be appreciated that the reaction between the rosin adduct and the epoxy resin may actually yield a mixture of reaction products including molecules containing rosin adduct, epoxy resin and two epoxy groups, molecules containing rosin adduct, epoxy resin and one epoxy group, unreacted epoxy resin, and/or unreacted rosin adduct. Use of an excess of epoxy resin in the reaction will minimize if not eliminate the presence of unreacted rosin adduct in the reaction mixture. The conditions can be controlled to result in a reaction mixture that is predominantly molecules containing rosin adduct, epoxy resin and two epoxy groups.

As noted above, the present invention is directed to an aqueous dispersion comprising the modified epoxy described above. Dispersions can be prepared by converting unreacted epoxy groups in the modified epoxy resin to cationic or anionic groups. In certain embodiments the unreacted epoxy groups are converted to cationic salt groups. Cationic salt groups can be introduced by the reaction of epoxy functionality on the modified epoxy resin with appropriate salt forming compounds. For example, sulfonium salt groups can be introduced by reacting a sulfide in the presence of an acid, as described in U.S. Pat. Nos. 3,959,106 and 4,715,898 hereby incorporated by reference; amine salt groups can be derived from the reaction of epoxy functionality on the modified epoxy resin with a compound containing a primary or secondary amine group, such as methylamine, diethanolamine, ammonia, diisopropanolamine, N-methyl ethanolamine, diethylentriamine, dipropylenetriamine, bishexamethylenetriamine, the diketimine of diethylentriamine, the diketimine of dipropylenetriamine, the diketimine of bishexamethylenetriamine and mixtures thereof. The amine groups can then be at least partially neutralized with an acid. Suitable acids include organic and inorganic acids such as formic acid, acetic acid, lactic acid, phosphoric acid, dimethylolpropionic acid, sulfamic acid and mixtures thereof. The resulting modified epoxy resin can contain primary, secondary and/or tertiary amino groups.

The modified epoxy resin comprising cationic or anionic groups can be dispersed in a dispersing medium, such as water. The dispersion step may be accomplished by combining the neutralized or partially neutralized modified epoxy resin with the dispersing medium. Neutralization and dispersion can be accomplished in one step by combining the resin and the dispersing medium, or by any other means known in the art. The modified epoxy resin can be added to the dispersing medium or the dispersing medium can added to the resin (or its salt). In certain embodiments, the pH of the dispersion is within the range of 4 to 9. The modified epoxy can comprise 5 to 60 wt %, such as 10 to 50 wt % of the aqueous dispersion, with weight percent based on total weight of the dispersion.

The present invention is further directed to a coating comprising a modified epoxy as described herein, such as in the form of the aqueous dispersion also described herein. A "coating" according to the present invention will generally be understood as a composition that, when cured, can form a substantially continuous film or layer that may provide a decorative and/or protective function and in certain embodiments is not tacky or sticky. The coatings of the present invention can comprise 5 to 100 wt %, such as 10 to 95 or 20 to 90 wt %, based on total solids weight, of the modified epoxy resin. When these resins are used in a coating, the coating may comprise 10 wt % or greater rosin, such as 20 wt % or greater, or 30 wt % or greater, with weight percent based on total solids weight.

It will be appreciated that when the present modified epoxy resins are used in a coating according to the present invention, they can form all or part of the film-forming resin of the coating. In certain embodiments, one or more additional film-forming resins are also used in the coating. For example, the coating compositions can comprise any of a variety of thermoplastic and/or thermosetting compositions known in the art. The coating compositions may be water-based or solvent-based liquid compositions, or, alternatively, may be in solid particulate form, i.e., a powder coating.

Thermosetting or curable coating compositions typically comprise film forming polymers or resins having functional groups that are reactive with either themselves or a crosslinking agent. The film-forming resin can be selected from, for example, epoxy resins, acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. In certain embodiments, the use of hydroxy free drying and/or semi drying fatty acid esters and/or oil esters is specifically excluded.

Appropriate mixtures of film-forming resins may also be used in the preparation of the coating compositions.

The thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing. In certain embodiments, the modified epoxy resin can be self crosslinking. Self crosslinking means that the reaction product contains functional groups that are capable of reacting with themselves, such as alkoxysilane groups, or that the reaction product contains functional groups that are coreactive, for example hydroxyl groups and blocked isocyanate groups. In certain embodiments, blocked isocyanate groups can be introduced into the modified epoxy resin by reacting residual epoxy groups with the reaction product of a polyamine containing primary and secondary amine groups and an acyclic carbonate as described in WO 2006110515, incorporated by reference herein.

In certain embodiments, the present coating is not a cationic electrodepositable coating ("ecoat"). A cationic ecoat will be understood as one in which cationic salt groups are introduced by the reaction of the epoxy group with appropriate salt forming compounds The coating compositions may also include a solvent. Suitable solvents include water, organic solvent(s) and/or mixtures thereof. Suitable solvents include glycols, glycol ether alcohols, alcohols, ketones, and aromatics, such as xylene and toluene, acetates, mineral spirits, naphthas and/or mixtures thereof. "Acetates" include the glycol ether acetates. In certain embodiments, the solvent is a non-aqueous solvent. "Non-aqueous solvent" and like terms means that less than 50 percent of the solvent is water. For example, less than 10 percent, or even less than 5 percent of the solvent can be water. It will be understood that mixtures of solvents, including or excluding water in an amount of less than 50 percent, can constitute a "non-aqueous solvent". In other embodiments, the coating is aqueous or water-based. This means that 50% or more of the solvent is water. These embodiments have less than 50%, such as less than 20%, less than 10%, less than 5% or less than 2% solvent.

If desired, the coating compositions can comprise other optional materials well known in the art of formulating coatings, such as plasticizers, anti-oxidants, hindered amine light stabilizers, UV light absorbers and stabilizers, surfactants, flow control agents, thixotropic agents, colorants, fillers, organic cosolvents, reactive diluents, catalysts, grind vehicles, and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention.

Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 wt % of the present compositions, such as from 3 to 40 wt % or 5 to 35 wt %, with weight percent based on the total weight of the composition.

It will be further appreciated that the coatings described herein can be either "one component" ("1K"), "two component" ("2K"), or even multi-component compositions. A 1K composition will be understood as referring to a composition wherein all of the coating components are maintained in the same container after manufacture, during storage, etc. A 1K coating can be applied to a substrate and cured by any conventional means, such as by heating, forced air, and the like. The present coatings can also be 2K coatings or multi-component coatings, which will be understood as coatings in which various components are maintained separately until just prior to application.

As stated above, in certain embodiments, the modified epoxy of the present invention can react with, and become part of the film-forming resin of the coating. That is, the modified epoxy resin described herein will react, thereby contributing to the cure of the coating.

The present coatings can be applied to any substrates known in the art, for example automotive substrates and industrial substrates. These substrates can be, for example, metallic, polymeric, transparent plastic substrates, polycarbonate, wood substrates and the like.

The coatings of the present invention can be applied by any means standard in the art such as electrocoating, spraying, electrostatic spraying, dipping, rolling brushing, and the like.

The coatings can be applied to a dry film thickness of 0.1 to 5.0 mils, such as 0.5 to 3.0 or 0.9 to 2.0 mils. The coatings of the present invention can be used alone, or in combination with other coatings. For example, the coatings can be pigmented or unpigmented, and can be used as a primer, e-coat, base coat, top coat, automotive repair coat and the like. For substrates coated with multiple coatings, one or more of those coatings can be coatings as described herein.

As used herein, unless otherwise expressly specified, all numbers such as those expressing values, ranges, amounts or percentages may be read as if prefaced by the word "about", even if the term does not expressly appear. Also, any numerical range recited herein is intended to include all subranges subsumed therein. Singular encompasses plural and vice versa. For example, although reference is made herein, including the claims, to "a" rosin, "a" dienophile, "a" carboxylic acid group, "an" anhydride group, "an" epoxy resin, "a" modified epoxy and the like, one or more of each of these and any other components can be used. "Including" means "including, but not limited to". As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

|   |   | Mass (/g) |
|---|---|---|
| A | gum rosin[1] | 496.25 |
| B | acrylic acid | 102.72 |
| C | 4-methoxyphenol | 1.03 |

[1]Brazillian gum rosin, available from Gehring-Montgomery.

Components A, B and C were charged to a flask equipped with an air inlet, stirrer, condenser and thermocouple. The flask contents were heated slowly until they reached 140° C. and then this temperature was maintained for one hour. The temperature was then increased to 170° C. and then maintained for three hours. The reaction mixture was then poured on to a foil lined tray and allowed to cool before being broken up in to small pieces. The product had an acid value of 222.5 mg KOH/g.

Example 2

|   |   | Mass (/g) |
|---|---|---|
| A | SYLVAROS NCY[2] | 165.1 |
| B | acrylic acid | 34.55 |
| C | hydroquinone | 0.55 |

[2]Tall oil rosin, available from Arizona Chemical.

Components A, B and C were charged to a flask equipped with an air inlet, stirrer, condenser and thermocouple. The flask contents were heated slowly until they reached 140° C. and then this temperature was maintained for one hour. The temperature was then increased to 170° C. and then maintained for three hours. The reaction mixture was then poured on to a foil lined tray and allowed to cool before being broken up in to small pieces. The product had an acid value of 225.1 mg KOH/g.

Example 3

|   |   | Mass (/g) |
|---|---|---|
| A | gum rosin | 518.67 |
| B | acrylic acid | 80.52 |
| C | 4-methoxyphenol | 0.80 |

Components A, B and C were charged to a flask equipped with an air inlet, stirrer, condenser and thermocouple. The flask contents were heated slowly until they reached 140° C. and then this temperature was maintained for one hour. The temperature was then increased to 170° C. and then maintained for three hours. The reaction mixture was then poured on to a foil lined tray and allowed to cool before being broken up in to small pieces. The product had an acid value of 213.2 mg KOH/g.

Example 4

|   |   | Mass (/g) |
|---|---|---|
| A | gum rosin | 496.25 |
| B | acrylic acid | 102.72 |
| C | 4-methoxyphenol | 1.03 |

Components A, B and C were charged to a 1-liter stirred stainless steel pressure reactor. The agitation on the reactor was set at 500 rpms and the reactor temperature was adjusted to 140° C. The temperature was then increased to 200° C. and the pressure was adjusted to 1000 PSI with nitrogen. These conditions were maintained for one hour. The reactor was then cooled to 120° C. and vented and the reaction mixture was poured on to a foil-lined tray and allowed to cool before being broken up in to small pieces. The product had an acid value of 231.7 mg KOH/g.

Example 5

|   |   | Mass (/g) |
|---|---|---|
| 1 | EPON 828[3] | 244.21 |
| 2 | rosin adduct of Example 1 | 202.38 |
| 3 | ethyltriphenyl phosphonium iodide | 0.30 |
| 4 | methyl isobutyl ketone | 26.01 |
| 5 | methyl isobutyl ketone | 0.73 |
| 6 | crosslinker, prepared as described below | 194.84 |
| 7 | DETA diketimine | 15.22 |
| 8 | N-methyl ethanolamine | 3.05 |

[3]Glycidyl ether of Bisphenol A, available from Resolution.
[4]Diketimine formed from diethylene triamine and methylisobutyl ketone (72.69% solids in methylisobutyl ketone).

Components 1-4 were charged to a flask equipped with a nitrogen inlet, stirrer, condenser and thermocouple. The flask contents were heated slowly until they reached 140° C. and then this temperature was maintained for one hour. 5 was added and the temperature was adjusted to 127° C. 6 and 7 were added, followed one minute later by 8. After the exotherm, the temperature was adjusted to 116° C. and this temperature was maintained for two hours. The modified epoxy resin mixture (618.1 g) was dispersed in aqueous medium by adding it to a mixture of 25.54 g of sulfamic acid and 337.74 g of deionized water warmed to 30° C. under vigorous agitation. After 30 minutes, 5.32 g of a 30% solution of gum rosin in butylcarbitol formal was added followed, 45 minutes later by 493.33 g of deionized water. The dispersion was thinned with more deionized water and vacuum stripped to remove organic solvent to give a dispersion having a solids content of 27.8 percent. The reaction product had Z average molecular weight of 156 783 (determined by gel permeation chromatography in DMF using polystyrene as a standard).

Example 6

|   |   | Mass (/g) |
|---|---|---|
| 1 | EPON 828 | 219.81 |
| 2 | rosin adduct from Example 2 | 183.80 |
| 3 | ethyltriphenyl phosphonium iodide | 0.28 |
| 4 | methyl isobutyl ketone | 23.51 |
| 5 | methyl isobutyl ketone | 0.66 |
| 6 | crosslinker | 176.08 |
| 7 | DETA diketimine | 13.76 |
| 8 | N-methyl ethanolamine | 2.76 |

Components 1-4 were charged to a flask equipped with a nitrogen inlet, stirrer, condenser and thermocouple. The flask contents were heated slowly until they reached 140° C. and then this temperature was maintained for one hour. 5 was added and the temperature was adjusted to 127° C. 6 and 7 were added, followed one minute later by 8. After the exotherm, the temperature was adjusted to 116° C. and this temperature was maintained for two hours. The modified epoxy resin mixture (558.6 g) was dispersed in aqueous medium by adding it to a mixture of 23.08 g of sulfamic acid and 305.23 g of deionized water warmed to 30° C. under vigorous agitation. After 30 minutes, 4.80 g of a 30% solution of gum rosin in butylcarbitol formal was added followed, 45 minutes later by 445.85 g of deionized water. The dispersion was thinned with more deionized water and vacuum stripped to remove organic solvent to give a dispersion having a solids content of 31.0 percent. The reaction product had Z average molecular weight of 48 876 (determined by gel permeation chromatography in DMF using polystyrene as a standard).

Example 7

|   |   | Mass (/g) |
|---|---|---|
| 1 | EPON 828 | 238.50 |
| 2 | rosin adduct from Example 3 | 208.10 |
| 3 | ethyltriphenyl phosphonium iodide | 0.30 |
| 4 | methyl isobutyl ketone | 26.01 |
| 5 | methyl isobutyl ketone | 0.73 |
| 6 | crosslinker | 194.84 |
| 7 | DETA diketimine | 15.22 |
| 8 | N-methyl ethanolamine | 3.05 |

Components 1-4 were charged to a flask equipped with a nitrogen inlet, stirrer, condenser and thermocouple. The flask contents were heated slowly until they reached 140° C. and then this temperature was maintained for one hour. 5 was added and the temperature was adjusted to 127° C. 6 and 7 were added, followed one minute later by 8. After the exotherm, the temperature was adjusted to 116° C. and this temperature was maintained for two hours. The modified epoxy resin mixture (618.07 g) was dispersed in aqueous medium by adding it to a mixture of 25.54 g of sulfamic acid and 337.74 g of deionized water warmed to 30° C. under vigorous agitation. After 30 minutes, 5.32 g of a 30% solution of gum rosin in butylcarbitol formal was added followed, 45 minutes later by 493.33 g of deionized water. The dispersion was thinned with more deionized water and vacuum stripped to remove organic solvent to give a dispersion having a solids content of 35.5 percent. The reaction product had Z average molecular weight of 33 896 (determined by gel permeation chromatography in DMF using polystyrene as a standard).

Example 8

|   |   | Mass (/g) |
|---|---|---|
| 1 | EPON 828 | 245.76 |
| 2 | rosin adduct of Example 4 | 200.84 |
| 3 | ethyltriphenyl phosphonium iodide | 0.30 |
| 4 | methyl isobutyl ketone | 26.01 |
| 5 | methyl isobutyl ketone | 0.73 |
| 6 | crosslinker | 194.84 |
| 7 | DETA diketimine | 15.22 |
| 8 | N-methyl ethanolamine | 3.05 |

Components 1-4 were charged to a flask equipped with a nitrogen inlet, stirrer, condenser and thermocouple. The flask contents were heated slowly until they reached 140° C. and then this temperature was maintained for one hour. 5 was added and the temperature was adjusted to 127° C. 6 and 7 were added, followed one minute later by 8. After the exotherm, the temperature was adjusted to 116° C. and this temperature was maintained for two hours. The modified epoxy resin mixture (618.07 g) was dispersed in aqueous medium by adding it to a mixture of 25.54 g of sulfamic acid and 337.74 g of deionized water warmed to 30° C. under vigorous agitation. After 30 minutes, 5.32 g of a 30% solution of gum rosin in butylcarbitol formal was added followed, 45 minutes later by 493.33 g of deionized water. The dispersion was thinned with more deionized water and vacuum stripped to remove organic solvent to give a dispersion having a solids content of 32.0 percent. The reaction product had Z average molecular weight of 47 612 (determined by gel permeation chromatography in DMF using polystyrene as a standard).

The crosslinker was prepared from the following ingredients:

| INGREDIENTS | PARTS BY WEIGHT |
|---|---|
| Bis (hexamethylene) triamine[5] | 1938.51 |
| Propylene carbonate | 1840.68 |
| Methyl isobutyl ketone | 1619.65 |

[5]DYTEK BHMT-HP available from Invista.

The bis (hexamethylene) triamine was charged to a reaction vessel and heated under a nitrogen atmosphere. The propylene carbonate was added over 3 hours. The reaction mixture exothermed to 68° C. and was then cooled and maintained at 60° C. The mixture was held at 60° C. for an additional 2 hours and then methyl isobutyl ketone was added.

Example 9

This example describes the preparation of an electrodeposition bath composition. The electrodeposition bath was prepared from a mixture of the following ingredients:

| INGREDIENTS | PARTS BY WEIGHT |
|---|---|
| Resin and deionized water | See table below |
| Plasticizer[6] | 7.3 |
| Flexibilizer[7] | 96.7 |
| Flow Additive[8] | 74.8 |
| ethylene glycol monohexylether. | 12.0 |
| propylene glycol monomethyl ether | 5.7 |
| pigment paste prepared as described below | 140.8 |

[6]MAZON-1651, a plasticizer based on butyl carbitol and formaldehyde, available from BASF.
[7]An aqueous dispersion of a flexibilizer/flow control agent generally in accordance with U.S. Pat. No. 4,423,166. The flexibilizer/flow control agent was prepared from a polyepoxide (EPON 828) and a polyoxyalkylenepolyamine (JEFFAMINE D2000 from Texaco Chemical Co.). The flexibilizer/flow control agent was dispersed in aqueous medium with the aid of lactic acid and the dispersion had a resin solids content of 46.2 percent by weight.
[8]A cationic microgel prepared as generally described in Examples A and B of U.S. Pat. No. 5,096,556, with the exception that acetic acid instead of lactic acid was used to disperse the soap of Example A, and EPON 828 solution was added after stripping rather than before in Example B. The resin had a final solids content of 17.9%.

| Cationic Dispersion | Dispersion Parts by Weight | De-ionized Water Parts by Weight |
|---|---|---|
| Example 7 | 987.5 | 1087.1 |
| Example 8 | 1094.6 | 968.0 |

The paint was made by adding the plasticizer, flexibilizer, flow additive, and solvents to the cationic dispersion under agitation. The blend was then reduced with 500 parts of the deionized water. The pigment paste is reduced with 300 parts of the deionized water, and then blended into the reduced resin mixture under agitation. The remainder of the deionized water was then added under agitation. Final bath solids were about 20%, with a pigment to resin ratio of 0.12:1.0. The paint was allowed to agitate at least two hours. Thirty percent of the total paint weight was removed by ultrafiltration and replaced with deionized water.

The pigment paste used above was prepared from a mixture of the following ingredients:

| INGREDIENTS | PARTS BY WEIGHT |
|---|---|
| Cationic grind resin[9] | 525.3 |
| SURFYNOL GA[10] | 1.4 |
| catalyst paste, prepared as described below | 175.3 |
| ASP-200[11] | 316.6 |
| CSX-333[12] | 4.3 |
| TRONOX CR800E[13] | 40.3 |
| Deionized water | 50.3 |

[9]As described in Example 2 of U.S. Pat. No. 4,715,898.
[10]Nonionic surfactant, available from Air Products and Chemicals, Inc.
[11]Aluminum silicate, available from Engelhard Corporation.
[12]Carbon black beads, available from Cabot Corp.
[13]Titanium dioxide pigment, available from Tronox Inc.

The above ingredients were added sequentially under high shear agitation. After the ingredients were thoroughly blended, the pigment paste was transferred to a vertical sand mill and ground to a Hegman value of about 7.25. The pigment paste was then collected. The measured solids were 55% following 1 hr @110° C.

The catalyst paste was prepared from a mixture of the following ingredients:

| INGREDIENTS | PARTS BY WEIGHT |
|---|---|
| Cationic grind resin[14] | 527.7 |
| n-Butoxypropanol | 6.9 |
| FASCAT 4201[15] | 312.0 |
| Deionized water | 59.8 |

[14]As described in Example 2 of U.S. Pat. No. 4,715,898, plus 2% by weight on solids of ICOMEEN T-2, available from BASF.
[15]Available from Arkema, Inc.

The catalyst paste was prepared by sequentially adding the above ingredients under high shear agitation. After the ingredients were thoroughly blended, the pigment paste was transferred to a vertical sand mill and ground to a Hegman value of about 7.25. The catalyst paste was then collected. The measured solids were 51% following 1 hr @110° C.

Electrocoating Procedure:

Bath compositions prepared as described above were electrodeposited onto phosphated cold rolled steel panels, commercially available from ACT Laboratories. The phosphate, which is commercially available from PPG Industries, Inc., was CHEMFOS 700 with a deionized water rinse. Conditions for cationic electrodeposition were 2 minutes at 92° F., voltages are listed in the chart below, specific to each resin to yield a cured dry film thickness of about 0.80 mils. The electrocoated substrates were cured in an electric oven for 25 minutes at 350° F. The electrocoated panels were tested against a standard electrocoat product and the results are recorded in Table 1. The control product is ED-6280 electrocoat available from PPG Industries Inc.

TABLE 1

| | Test Paint based on dispersion of Example 7 | Test Paint based on dispersion of Example 8 | ED6280 Control Paint |
|---|---|---|---|
| Applied Voltage | 150 | 200 | 175 |
| Scribe creep - 20 cycles Corrosion Testing[16] | 4.0 mm | 3.5 mm | 3.25 mm |
| Solvent Resistance[17] | Very slight mar | Very slight mar | No effect |
| QCT humidity adhesion[18] | 10 | 10 | 10 |

[16]Each coated panel was scribed, cutting through the coating to the metal substrate in an X pattern. The test panels were then subjected to cyclic corrosion testing by rotating test panels through a salt solution, room temperature dry, and humidity and low temperature in accordance with General Motors test method, GM TM 54-26. Scribe creep is reported as the maximum width (in millimeters) of corrosion across the scribe mark.
[17]A cloth soaked in acetone was rubbed back and forth across the panel for a period of 100 double strokes. The amount of surface damage that has occurred was then rated.
[18]Crosshatch adhesion performed before and after condensing humidity exposure for 16 hours at 140° F. on a QCT condensation tester (Q-Panel Company, Cleveland, OH). A rating of 10 indicates no adhesion failure.

The above results demonstrate that the compositions of the invention derived in part from a low cost renewable resource have properties similar to a standard market acceptable electrocoat.

Whereas particular embodiments of this invention have been described above for purposes of illustration, it will be evident to those skilled in the art that numerous variations of the details of the present invention may be made without departing from the invention as defined in the appended claims.

I claim:

1. An aqueous dispersion comprising a modified epoxy resin comprising the reaction product of rosin and a dienophile comprising a carboxylic group and/or an anhydride group, further reacted with an epoxy resin, wherein the dienophile comprises acrylic acid.

2. An aqueous dispersion comprising a modified epoxy resin comprising the reaction product of rosin and a dienophile comprising a carboxylic group and/or an anhydride group, further reacted with an epoxy resin, wherein the dienophile comprises monocarboxylic acid.

3. The aqueous dispersion of claim 1, wherein the epoxy resin comprises an epoxy functional acrylic resin.

4. A coating comprising a modified epoxy resin comprising the reaction product of rosin and a dienophile comprising a carboxylic group and/or an anhydride group, further reacted with an epoxy resin, the coating further comprising a curing agent for the modified epoxy resin, wherein the coating is not a cationic electrodeposition coating.

5. The coating of claim 4, wherein the resin is part of the film-forming resin.

6. The coating of claim 4, wherein the resin comprises 10 to 95 wt% of the coating, based on total solids weight.

7. The coating of claim 4, wherein the resin comprises 20 to 90 wt% of the coating, based on total solids weight.

8. The coating of claim 4, wherein the coating comprises a colorant.

9. The coating of claim 4, wherein the coating is substantially clear.

10. The coating of claim 4, wherein the coating is a two component coating, and the resin is in one component and the curing agent for the resin is in another component.

11. The coating of claim 4, wherein the epoxy resin comprises the diglycidyl ether of bisphenol A.

12. The coating of claim 4, wherein the dienophile comprises acrylic acid.

13. The coating of claim 4, wherein the dienophile comprises monocarboxylic acid.

14. The coating of claim 4, wherein the coating is water based.

15. The aqueous dispersion of claim 2, wherein the epoxy resin comprises an epoxy functional acrylic resin.

* * * * *